(12) United States Patent
Okamoto et al.

(10) Patent No.: US 10,724,898 B2
(45) Date of Patent: Jul. 28, 2020

(54) DETECTING METHOD, DETECTING DEVICE, AND PROJECTING DEVICE

(71) Applicant: JVC KENWOOD Corporation, Yokohama-shi, Kanagawa (JP)

(72) Inventors: Naoya Okamoto, Yokohama (JP); Naoya Aizu, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 231 days.

(21) Appl. No.: 15/209,997

(22) Filed: Jul. 14, 2016

(65) Prior Publication Data

US 2017/0089758 A1 Mar. 30, 2017

(30) Foreign Application Priority Data

Sep. 30, 2015 (JP) .................. 2015-194246

(51) Int. Cl.
*H04N 9/31* (2006.01)
*G01J 1/42* (2006.01)
*G03B 33/00* (2006.01)
*G01J 1/32* (2006.01)
*G03B 21/00* (2006.01)
*G03B 21/20* (2006.01)

(52) U.S. Cl.
CPC . *G01J 1/42* (2013.01); *G01J 1/32* (2013.01); *G03B 21/006* (2013.01); *G03B 21/204* (2013.01); *G03B 21/2053* (2013.01); *G03B 33/00* (2013.01); *H04N 9/312* (2013.01); *H04N 9/3105* (2013.01); *H04N 9/3161* (2013.01); *H04N 9/3167* (2013.01)

(58) Field of Classification Search
CPC .................................. H04N 9/3105
USPC ........................................ 348/752
See application file for complete search history.

(56) References Cited

U.S. PATENT DOCUMENTS

| | | | |
|---|---|---|---|
| 5,815,221 A * | 9/1998 | Kojima | H04N 9/3188 348/750 |
| 8,858,000 B2 | 10/2014 | Tsuda et al. | |
| 9,063,403 B2 | 6/2015 | Tsuda et al. | |
| 2002/0171807 A1 * | 11/2002 | Hibi | H04N 5/74 352/198 |
| 2005/0157265 A1 * | 7/2005 | Florence | G03B 21/14 353/20 |
| 2010/0067086 A1 * | 3/2010 | Khan | G02B 5/12 359/239 |

(Continued)

FOREIGN PATENT DOCUMENTS

JP 2012-047951 3/2012

*Primary Examiner* — Jefferey F Harold
*Assistant Examiner* — Justin B Sanders
(74) *Attorney, Agent, or Firm* — Amin, Turocy & Watson, LLP

(57) ABSTRACT

Light emitted from a light source is irradiated to a reflective light modulator which modulates irradiated light to reflect based on image data and the light reflected by the light modulator is projected. A ratio of return light returning from the light modulator to the light source to the light irradiated to the light modulator is calculated based on the image data. A light amount of the light emitted from the light source is calculated by using the calculated ratio and a detection output of an optical sensor provided between the light source and the light modulator.

13 Claims, 14 Drawing Sheets

(56) References Cited

U.S. PATENT DOCUMENTS

2010/0201894 A1* 8/2010 Nakayama ........... G09G 3/3433
348/745
2014/0192331 A1* 7/2014 Toyooka .............. G03B 21/006
353/85

* cited by examiner

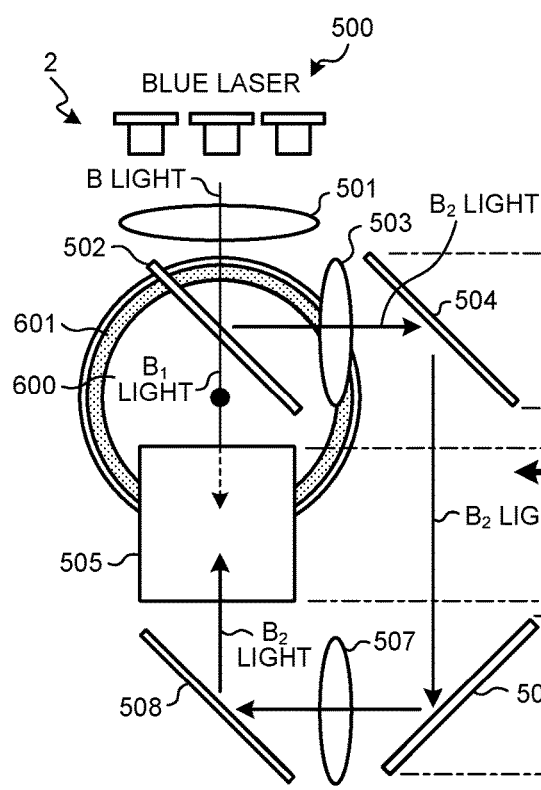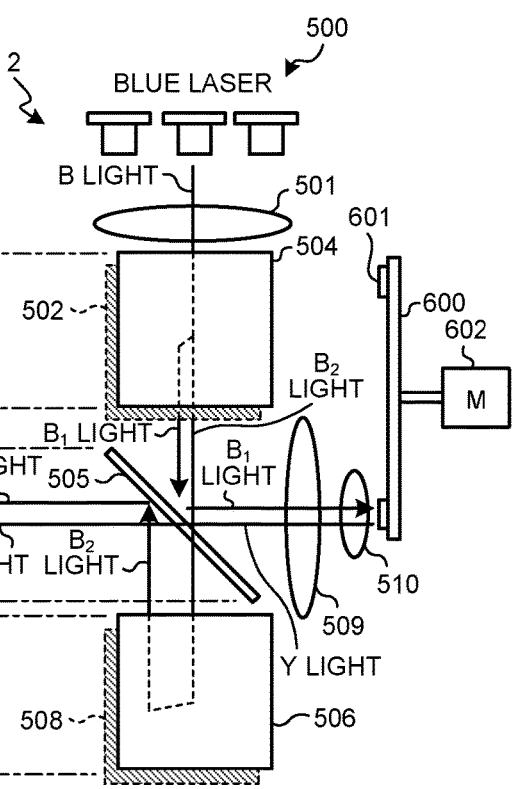
FIG.2A (FRONT VIEW)
FIG.2B (SIDE VIEW)
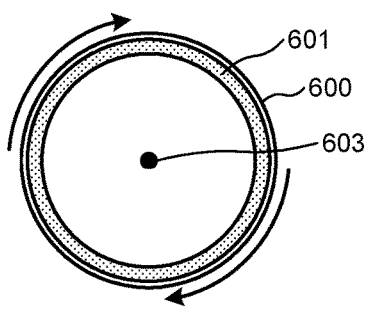
FIG.3

EXAMPLE OF RELATIONSHIP BETWEEN GRADATION
VALUE AND SENSOR DETECTION OUTPUT Dt

DETECTING METHOD, DETECTING DEVICE, AND PROJECTING DEVICE

CROSS-REFERENCE TO RELATED APPLICATION(S)

The present application claims priority to and incorporates by reference the entire contents of Japanese Patent Application No. 2015-194246 filed in Japan on Sep. 30, 2015.

BACKGROUND OF THE INVENTION

1. Field of the Invention

The present invention relates to a detecting method, a detecting device, and a projecting device.

2. Description of the Related Art

A projecting device which reflects light from a light source by a reflective light modulator to modulate based on image data and selectively reflects the modulated light by a reflective polarization plate to project an image on a projected medium is known. In such projecting device, it is possible to stabilize a light amount of the light source by detecting the light amount of the light source by an optical sensor arranged on an optical path of the light emitted from the light source to feedback-control the light source based on the detected light amount.

Japanese Laid-open Patent Publication No. JP 2012-47951 A discloses a configuration in which an optical sensor is arranged in proximity to an optical path between a rotating fluorescent plate on which light emitted from a fixed light source is incident and a liquid crystal light modulator on which the light emitted from the rotating fluorescent plate is incident for controlling the fixed light source or the liquid crystal light modulator according to a detection result of the optical sensor.

In a projecting device in which a reflective light modulator is used, a part of light reflected by the reflective light modulator is transmitted according to image data through a reflective polarization plate to return to a light source. Therefore, an optical sensor arranged in proximity to an optical path between the light source and the reflective light modulator detects the light returning from the reflective light modulator to the light source together with the light emitted from the light source. Therefore, when the reflective light modulator is used, there is a problem that it is difficult to correctly detect a light amount of the light from the light source.

SUMMARY OF THE INVENTION

It is an object of the present invention to at least partially solve the problems in the conventional technology.

According to the present invention, there is provided a detecting method of detecting a light amount of light from a light source of a projecting device configured to irradiate the light emitted from the light source to a reflective light modulator configured to modulate irradiated light to reflect based on image data and project the light reflected by the light modulator, comprising: calculating a ratio of return light returning from the light modulator to the light source to the light irradiated to the light modulator based on the image data; and calculating the light amount of the light emitted from the light source by using a detection output of an optical sensor provided between the light source and the light modulator and the calculated ratio.

There is provided a detecting device configured to detect a light amount of light from a light source of a projecting device configured to irradiate the light emitted from the light source to a reflective light modulator configured to modulate irradiated light to reflect based on image data and project the light reflected by the light modulator, comprising: an optical sensor provided between the light source and the light modulator; a ratio calculator configured to calculate a ratio of return light returning from the light modulator to the light source to the light irradiated to the light modulator based on the image data; and a light amount calculator configured to calculate the light amount of the light emitted from the light source by using a detection output of the optical sensor and the ratio calculated by the ratio calculator.

There is provided a projecting device comprising: a reflective light modulator configured to modulate light emitted from a light source to reflect based on image data; an optical projector configured to project the light modulated by the light modulator; an optical sensor provided between the light source and the light modulator; a ratio calculator configured to calculate a ratio of return light returning from the light modulator to the light source to the light irradiated to the light modulator based on the image data; a light amount calculator configured to calculate a light amount of the light emitted from the light source by using a detection output of the optical sensor and the ratio calculated by the ratio calculator; and a driver configured to control the light amount of the light source based on the light amount calculated by the light amount calculator.

There is provided a projecting device comprising: a reflective light modulator configured to modulate light emitted from a light source to reflect based on image data; an optical projector configured to project the light modulated by the light modulator; an optical sensor provided between the light source and the light modulator; a ratio calculator configured to calculate a ratio of return light returning from the light modulator to the light source to the light irradiated to the light modulator based on the image data; a light amount calculator configured to calculate a light amount of the light emitted from the light source by using a detection output of the optical sensor and the ratio calculated by the ratio calculator; and a gain controller configured to control a gain of the image data based on the light amount calculated by the light amount calculator.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 2A and 2B are views illustrating a configuration of an example of a light source unit applicable to each embodiment;

FIG. 3 is a view illustrating a configuration of an example of a fluorescent substance wheel applicable to each embodiment;

DETAILED DESCRIPTION OF THE PREFERRED EMBODIMENTS

Preferred embodiments of a detecting method, a detecting device, and a projecting device are hereinafter described in detail with reference to the attached drawings. Specific numeric values and appearance configurations described in the embodiments are merely examples for facilitating understanding of the present invention and they do not limit the present invention unless otherwise described. Meanwhile, detailed description and illustration of elements which are not directly related to the present invention are omitted.

In each embodiment of the present invention, in a projecting device which irradiates light from a light source to a reflective light modulator which modulates and reflects the irradiated light based on image data, and projects the light reflected by the reflective light modulator through a deflection plate, a light amount of the light from the light source is obtained by using a detection output of an optical sensor arranged between the reflective light modulator and the light source. At that time, a ratio of return light returning from the reflective light modulator to the light source without contributing to projection to the light irradiated to the reflective light modulator is calculated based on the image data. The light amount of the light source is calculated based on the detection output of the optical sensor and the calculated ratio.

The detecting method and the detecting device according to each embodiment have the above-described configuration, so that it is possible to inhibit an effect of the return light on the detection output of the optical sensor to obtain the light amount of the light from the light source with a higher degree of accuracy.

Configuration Common to Embodiments

Figure 1:
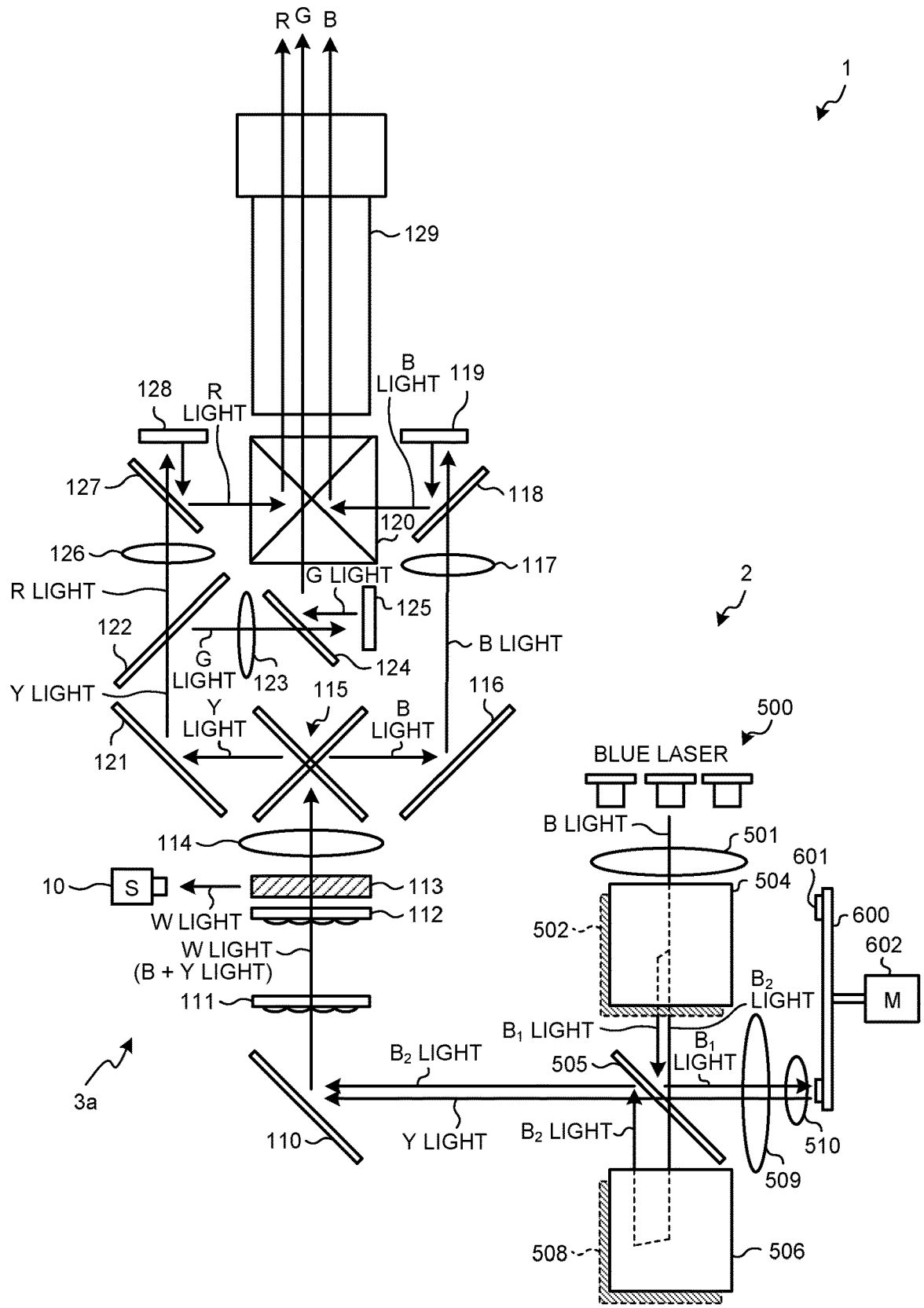
FIG. 1 is a view illustrating an example of a configuration of an optical system in a projecting device commonly applicable to each embodiment.

FIG. 1 illustrates an example of a configuration of an optical system in a projecting device 1 which may be commonly applied to the embodiments. Meanwhile, hereinafter, blue light, green light, red light, yellow light, and white light are appropriately represented as B light, G light, R light, Y light, and W light, respectively.

In FIG. 1, the projecting device 1 includes a light source unit 2 and an illumination optical unit 3a as a configuration of optical system. The light source unit 2 includes a light source 500 including one or more laser elements, for example, to emit light of a predetermined wavelength band (B light) visible as blue color and a fluorescent substance wheel 600 to which a fluorescent substance excited by the B light emitted from the light source 500 to emit the yellow light (Y light) is applied and emits the B light and Y light. Meanwhile, the light emitted from the light source unit 2 is actually the white light (W light) obtained by synthesizing the B light and Y light. A configuration of the light source unit 2 is described later.

The B light and Y light emitted from the light source unit 2 are incident on the illumination optical unit 3a and reflected by a mirror 110 such that a direction thereof is changed. Meanwhile, the mirror 110 may be omitted depending on a layout of the light source unit 2 and the illumination optical unit 3a.

The Y light and B light emitted from the mirror 110 are incident on a lens 114 through fly-eye lenses 111 and 112 and a polarization conversion element 113. The fly-eye lenses 111 and 112 form a uniform illumination optical system which, when each light (R light, G light, B light) based on the Y light and B light is irradiated to light modulators 119, 125, and 128 described later, disperses each light so as to be uniformly irradiated to the light modulators 119, 125, and 128.

The polarization conversion element 113 is obtained by combining a polarization beam splitter and a λ/2 plate for converting general light to polarized light and making polarization of the polarized light uniform. In this example, the polarization conversion element 113 converts incident light to S-polarized light. In the example in FIG. 1, an optical sensor 10 which detects the light is provided in proximity to a side surface of the polarization conversion element 113. The optical sensor 10 is a sensor for white light with sensitivity across an entire wavelength region for visible light. The optical sensor 10 in FIG. 1 detects the light leaked from the polarization conversion element 113 out of the B light and Y light incident on the polarization conversion element 113 and outputs a detection output Dt depending on a light amount of the detected light.

The Y light and B light converted to the S-polarized light are emitted from the polarization conversion element 113 to be incident on a light separator 115 which separates the B light from the Y light through the lens 114. The light separator 115 includes a first dichroic mirror which reflects light of a wavelength band of the B light and transmits light of a wavelength band of the Y light and a second dichroic mirror which reflects the light of the wavelength band of the Y light and transmits the light of the wavelength band of the B light, for example. The B light separated by the light separator 115 is emitted from the light separator 115 to be incident on a mirror 116. The Y light separated by the light separator 115 is emitted from the light separator 115 to be incident on a mirror 121.

The B light incident on the mirror 116 is incident on a reflective polarization plate 118 through a lens 117. The reflective polarization plate 118 transmits one of the S-polarized light and P-polarized light and reflects the other. Herein, suppose that the B light emitted from the lens 117 is the S-polarized light, the light reflected by the reflective light modulator 119 driven based on image data of B color out of the image data of respective colors of R, G, and B described later at a white level (maximum gradation) is the P-polarized light, and the reflective polarization plate 118 has a property of transmitting the S-polarized light and reflecting the P-polarized light.

The B light transmitted through the reflective polarization plate 118 is incident on the reflective light modulator 119. The reflective light modulator 119 is driven according to the image data of the B color and modulates and reflects the incident light on a pixel to pixel basis to emit. A reflective liquid crystal element such as a LCOS (liquid crystal on silicon) may be applied as the reflective light modulator 119, for example. This also applies to the other reflective light modulators 125 and 128 described later.

The B light modulated on a pixel to pixel basis depending on the image data of the B color by the reflective light modulator 119 is reflected by the reflective polarization plate 118 to be emitted in a changed direction and is incident on a first surface of a light synthesizing prism 120.

The Y light separated by the light separator 115 to be incident on the mirror 121 is reflected by the mirror 121 to be emitted from the mirror 121 in a changed direction. The Y light emitted from the mirror 121 is incident on a color component separator 122 and a green light component and a red light component are separated from the Y light. For example, the color component separator 122 is formed of a dichroic mirror which reflects a light of a wavelength band of the green light and transmits a light of a wavelength band of the red light.

The light of the green component (green light, hereinafter G light) separated from the Y light by the color component separator 122 is incident on a reflective polarization plate 124 through a lens 123. Similar to the above-described B light, suppose that the G light is the S-polarized light and the G light is transmitted through the reflective polarization plate 124 to be incident on the reflective light modulator 125 driven according to the image data of the G color. The reflective light modulator 125 modulates and reflects the incident G light on a pixel to pixel basis depending on the image data of the G color to emit. The G light emitted from the reflective light modulator 125 is reflected by the reflective polarization plate 124 to be incident on a second surface of the light synthesizing prism 120.

The light of the red component (red light, hereinafter R light) separated from the Y light by the color component separator 122 is incident on a reflective polarization plate 127 through a lens 126. Similar to the above-described B light, suppose that the R light is the S-polarized light and the R light is transmitted through the reflective polarization plate 127 to be incident on the reflective light modulator 128 driven according to the image data of the R color. The reflective light modulator 128 modulates and reflects the incident R light on a pixel to pixel basis depending on the image data of the R color to emit. The R light emitted from the reflective light modulator 128 is reflected by the reflective polarization plate 127 to be incident on a third surface of the light synthesizing prism 120.

The light synthesizing prism 120 synthesizes the B light, G light, and R light incident on the first, second, and third surfaces, respectively, to emit from a fourth surface as a light flux. The light flux including the R light, G light, and B light emitted from the light synthesizing prism 120 is emitted outward through an optical projection system 129.

FIGS. 2A and 2B illustrate a configuration of an example of the light source unit 2 applicable to each embodiment. FIG. 2A is a front view of a substantial part and FIG. 2B is a side view of the configuration in FIG. 2A seen from a direction of arrow "A". Hereinafter, FIGS. 2A and 2B are collectively described as FIG. 2 unless otherwise described.

In FIG. 2, the B light emitted from the light source 500 including one or more blue laser elements is incident on a dividing mirror 502 through a condenser lens 501. The dividing mirror 502 divides the incident B light into the first B light and the second B light. Hereinafter, the first B light and the second B light are represented as $B_1$ light and $B_2$ light, respectively, such that they may be easily discriminated from each other in the drawings.

The $B_2$ light reflected by the dividing mirror 502 to be divided is incident on a second surface of a dichroic mirror 505 through a relay optical system formed of a lens 503, a mirror 504, a mirror 506, a lens 507, and a mirror 508. An optical path on the relay optical system is formed on a first plane. The optical path on the relay optical system is not limited thereto and this may also be formed on the first plane and another plane parallel to the first plane.

The dichroic mirror 505 corresponds to the above-described first dichroic mirror and has a property of reflecting the light of the wavelength band of the B light and transmit the light of a band of a longer wavelength than the wavelength band of the B light (for example, the red light and green light).

On the other hand, the $B_1$ light transmitted through the dividing mirror 502 to be divided is incident on a first surface of the dichroic mirror 505.

The dichroic mirror 505 is provided so as to reflect the incident light in a direction orthogonal to the first plane. In the example in FIG. 2A, the dichroic mirror 505 is provided such that reflected light obtained by reflecting the $B_1$ light emitted from the light source 500 and transmitted through the dividing mirror 502 to be divided travels along an optical path from a front side to a rear side in FIG. 2A. That is to say, the optical path by the light reflected by the dichroic mirror 505 is formed on a second plane orthogonal to the first plane.

The $B_1$ light reflected by the dichroic mirror 505 is incident on the fluorescent substance wheel 600 through condenser lenses 509 and 510. FIG. 3 illustrates a configuration of an example of the fluorescent substance wheel 600 applicable to each embodiment. The fluorescent substance wheel 600 is such that a fluorescent substance surface 601 is concentrically formed on a mirror-like surface. The fluorescent substance excited by the light of the wavelength band of the B light to emit the yellow light (Y light) is applied to the fluorescent substance surface 601. Meanwhile, since yellow is obtained by mixing green and red in an additive color process, the yellow light emitted on the fluorescent substance surface 601 includes the red component and green component. The fluorescent substance wheel 600 is rotary-driven by a motor 602 about a rotary axis 603.

The Y light emitted on the fluorescent substance surface 601 is incident on the first surface of the dichroic mirror 505 through the condenser lenses 510 and 509. The Y light is transmitted through the dichroic mirror 505 to be emitted from the second surface of the dichroic mirror 505. In the example in FIG. 2A, the Y light is emitted from the rear side to the front side in a position of the dichroic mirror 505.

Herein, as described above, the $B_2$ light is incident on the second surface of the dichroic mirror 505 through the relay optical system. The $B_2$ light is reflected by the second surface of the dichroic mirror 505 to be emitted in the same direction as the Y light. That is to say, the direction of the optical path of the $B_2$ light is changed from the optical path on the first plane to the optical path on the second plane by the dichroic mirror 505.

The Y light and $B_2$ light emitted from the dichroic mirror 505 in this manner are emitted from the light source unit 2 as the B light and Y light to be incident on the mirror 110 as illustrated in FIG. 1.

First Embodiment

Figure 4:
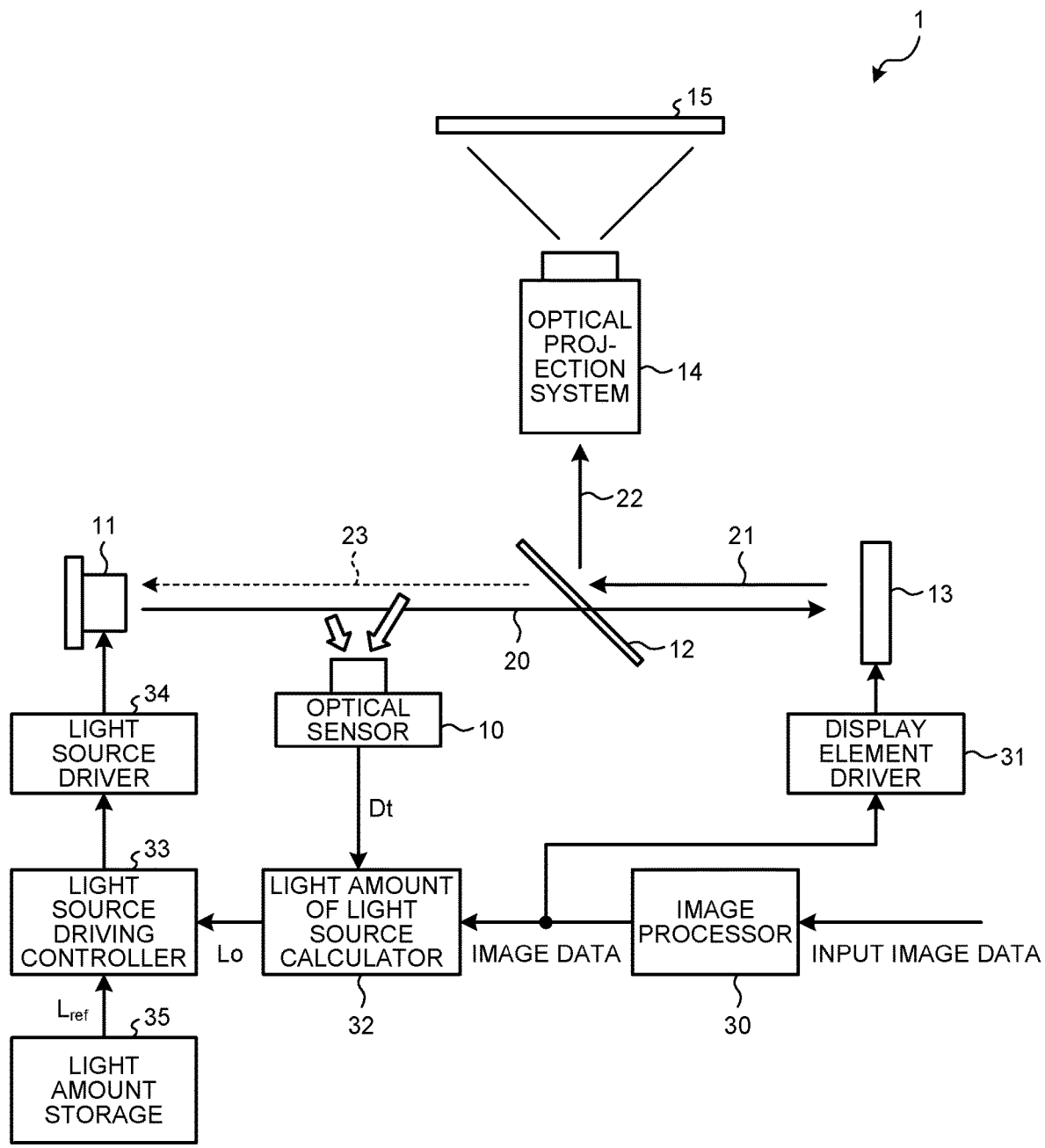
FIG. 4 is a block diagram illustrating a configuration of an example of a projecting device according to a first embodiment with a focus on a signal processing system.

FIG. 4 illustrates a configuration of an example of a projecting device 1 according to a first embodiment with a focus on a signal processing system. Meanwhile, in a configuration of an optical system illustrated in FIG. 4, a light source 11 corresponds to a light source 500 in FIG. 1 and other configuration of a light source unit 2 in FIG. 1 is omitted in FIG. 4. In FIG. 4, a reflective light modulator 13 corresponds to a reflective light modulator 119 to which B light is irradiated in FIG. 1 and a reflective polarization plate 12 corresponds to a reflective polarization plate 118 in FIG. 1. An optical projection system 14 in FIG. 4 corresponds to an optical projection system 129 in FIG. 1.

In FIG. 4, light 20 emitted from the light source 11 including one or more laser elements, for example, is incident on a first surface of the reflective polarization plate 12. Herein, as described with the reflective polarization plate 118 in FIG. 1, the reflective polarization plate 12 transmits S-polarized light and reflects P-polarized light. When the light 20 is the S-polarized light, the light 20 is transmitted through the reflective polarization plate 12 to be irradiated on the reflective light modulator 13. The reflective light modulator 13 is driven by a display element driver 31 described later according to image data and modulates and reflects the incident light 20 according to the image data to emit as light 21.

At that time, the light 21 is emitted as the P-polarized light when the image data is of a white level (maximum gradation) by the modulation depending on the image data by the reflective light modulator 13 driven based on the image data of respective colors of R, G, and B. When the image data is of a black level (minimum gradation), the light 21 is emitted as the S-polarized light. Furthermore, when the image data is of gray level gradation between the white level and the black level, the light 21 obtained by mixing a P-polarized component and an S-polarized component depending on the gradation is emitted.

The light 21 is incident on a second surface of the reflective polarization plate 12 and the P-polarized component is incident on the optical projection system 14 as light 22 depending on the modulation of the reflective light modulator 13 to be projected on a projected medium 15 such as a screen. The S-polarized component of the light 21 is transmitted through the reflective polarization plate 12 to return to the light source 11 as light 23. The light 23 transmitted through the reflective polarization plate 12 to return to the light source 11 is hereinafter referred to as "return light". The return light is generated when the gradation of the image data is other than the white level as described above.

In the above-described example in FIG. 1, the light of the S-polarized component out of the light reflected by the reflective light modulator 119, for example, is transmitted through the reflective polarization plate 118 to be incident on the lens 117 as the return light, thereafter travels inversely along an optical path at the time of incidence to be incident on a mirror 110 through a mirror 116, a light separator 115, a lens 114, a polarization conversion element 113, and fly-eye lenses 112 and 111, and is reflected by the mirror 110 to be emitted to the light source unit 2. In the polarization conversion element 113 on the optical path of the return light, leaking light of the return light is detected by an optical sensor 10 together with leaking light of the light from the light source unit 2.

In FIG. 4, the projecting device 1 includes an image processor 30, the display element driver 31, a light amount of a light source calculator 32, a light source driving controller 33, a light source driver 34, and a light amount storage 35 as the configuration of the signal processing system. Among them, the image processor 30, the light amount of a light source calculator 32, and the light source driving controller 33, for example, may be realized by a program on a CPU (central processing unit) mounted on the projecting device 1, or a part or all of them may be realized by hardware circuits cooperating with each other.

The image processor 30 is supplied with input image data from an external device of the projecting device 1, for example. The input image data includes data of pixels of the respective colors of R, G, and B, for example, and is input in units of frame at a predetermined frame rate. The image processor 30 applies predetermined image processing such as gamma correction processing using a gamma value γ to the supplied input image data to output. The image data output from the image processor 30 is supplied to the display element driver 31 and the light amount of the light source calculator 32.

The display element driver 31 generates a driving signal for driving the reflective light modulator 13 based on the image data supplied from the image processor 30. The driving signal is supplied to the reflective light modulator 13. The reflective light modulator 13 is driven on a pixel to pixel basis according to the driving signal supplied from the display element driver 31.

The light amount of the light source calculator 32 is supplied with the image data from the image processor 30 and is supplied with a detection output Dt from the optical sensor 10 which detects the light. The detection output Dt is the signal corresponding to a light amount of the light detected by the optical sensor 10. Herein, the optical sensor 10 detects the light 20 emitted from the light source 11 and the light 23 reflected by the reflective light modulator 13 to be transmitted through the reflective polarization plate 12. The detection output Dt is the signal according to the light amount obtained by adding up the light amount of the light 20 and the light amount of the light 23.

The light amount of the light source calculator 32 calculates a value indicating the light amount of the return light based on the image data supplied from the image processor 30 and obtains a light amount Lo of the light 20 from the light source 11 by using the calculated value indicating the return light amount and the detection output Dt of the optical sensor 10. Then, the light amount of the light source calculator 32 supplies the light amount Lo to the light source driving controller 33.

The light source driving controller 33 generates a driving control signal for controlling the light amount of the light source 11 and supplies the generated driving control signal to the light source driver 34. The light source driver 34 drives the light source 11 according to the driving control signal and cause the light source 11 to emit the light 20 with the light amount according to the driving control signal.

Herein, the light amount storage 35 is connected to the light source driving controller 33. The light amount storage 35 being a non-volatile memory embedded in the projecting device 1, for example, stores a reference value $L_{ref}$ indicating the light amount which serves as a reference of the light source 11 in advance. The value is stored in the light amount storage 35 at the time of factory shipping and system setting of the projecting device 1, for example.

The light source driving controller 33 compares the light amount Lo supplied from the light amount of the light source calculator 32 with the reference value $L_{ref}$ of the light amount stored in the light amount storage 35 and generates the drive control signal such that the light amount of the light source 11 is equal to the light amount according to the reference value $L_{ref}$. In this manner, the light amount of the light source 11 is feedback-controlled based on the detection output Dt by the optical sensor 10 and the reference value $L_{ref}$ stored in the light amount storage 35.

Figure 5:
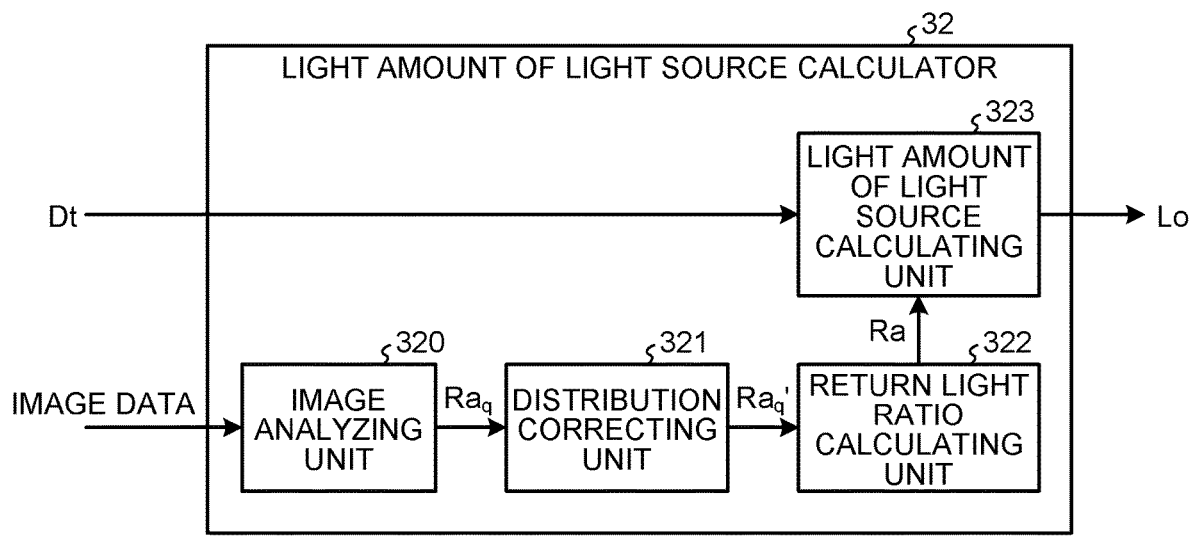
FIG. 5 is a block diagram illustrating a configuration of an example of a light amount of a light source calculator according to the first embodiment.

FIG. 5 illustrates a configuration of an example of the light amount of the light source calculator 32 according to the first embodiment. In FIG. 5, the light amount of the light source calculator 32 includes an image analyzing unit 320, a distribution correcting unit 321, a return light ratio calculating unit 322, and a light amount of the light source calculating unit 323.

The light amount of the light source calculating unit 323 is supplied with the detection output Dt from the optical sensor 10. The light amount of the light source calculating unit 323 calculates the light amount Lo of the light source 11 based on a return light ratio Ra calculated by the return light ratio calculating unit 322 as described later and the detection output Dt supplied from the optical sensor 10. The light amount of the light source calculating unit 323 outputs the calculated light amount Lo of the light source to the light source driving controller 33.

In the light amount of the light source calculator 32, the image data output from the image processor 30 is supplied to the image analyzing unit 320. The image analyzing unit 320 analyzes the supplied image data and calculates a light amount $Lr_q$ of the return light of each pixel based on the image data.

Figure 6A:
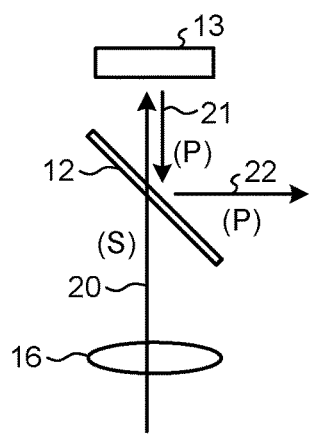
FIGS. 6A to 6C are views for illustrating a method of calculating a light amount $Lr_q$ of return light of each pixel according to the first embodiment.

With reference to FIGS. 6A to 8, a method of calculating the light amount $Lr_q$ of the return light of each pixel by the image analyzing unit 320 is described. FIGS. 6A to 6C more specifically illustrate the return light. Meanwhile, in FIGS. 6A to 6C, the same reference numerals are assigned to the portions common to FIG. 4 described above and the detailed description thereof are omitted.

FIG. 6A illustrates an example of a case in which the reflective light modulator 13 is driven by the image data of the white level. The light 20 of the S-polarized light emitted from the light source 11 is transmitted through the reflective polarization plate 12 to be irradiated to the reflective light modulator 13. The reflective light modulator 13 reflects the irradiated light 20 of the S-polarized light according to the image data of the white level and converts the same to the light 21 of the P-polarized light to emit.

Substantially entire light 21 of the P-polarized light emitted from the reflective light modulator 13 is reflected by the reflective polarization plate 12 to be emitted as the light 22. The light 22 is incident on the optical projection system 14 illustrated in FIG. 4. In this case, the substantially entire light 21 reflected by the reflective light modulator 13 is incident on the optical projection system 14, so that the projected image projected on the projected medium 15 is a substantially white image. The substantially entire light 21 is reflected by the reflective polarization plate 12, so that the light amount of the return light transmitted through the reflective polarization plate 12 to return to the light source 11 is minimized.

Figure 6B:
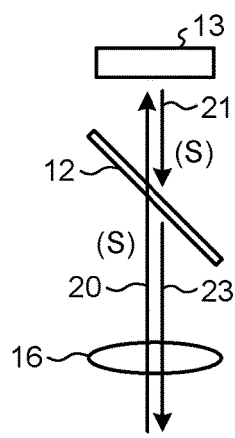

FIG. 6B illustrates an example of a case in which the reflective light modulator 13 is driven by the image data of the black level. Similar to the description above, the light 20 of the S-polarized light emitted from the light source 11 is transmitted through the reflective polarization plate 12 to be irradiated to the reflective light modulator 13. The reflective light modulator 13 reflects the irradiated light 20 of the S-polarized light without changing a polarization state thereof according to the image data of the black level to emit as the light 21 of the S-polarized light.

Substantially entire light 21 of the S-polarized light emitted from the reflective light modulator 13 is transmitted through the reflective polarization plate 12 to become the return light 23 and returns in a direction to the light source 11. In this case, the light 21 reflected by the reflective light modulator 13 is scarcely incident on the optical projection system 14, so that the projected image projected on the projected medium 15 is a substantially black image. The light amount of the return light 23 is maximized.

Figure 6C:
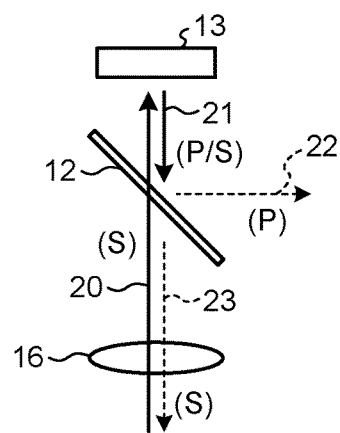

FIG. 6C illustrates an example of a case in which the reflective light modulator 13 is driven by the image data of the gray level, that is to say, the image data with a gradation value between a maximum value and a minimum value. Similar to the description above, the light 20 of the S-polarized light emitted from the light source 11 is transmitted through the reflective polarization plate 12 to be irradiated to the reflective light modulator 13. The reflective light modulator 13 reflects and converts the irradiated light 20 of the S-polarized light to emit the light 21 of the P-polarized light and the S-polarized light mixed depending on the gradation value of the image data according to the image data of the gray level.

The light 21 of the P-polarized light and the S-polarized light emitted from the reflective light modulator 13 is incident on the reflective polarization plate 12. The reflective polarization plate 12 reflects the P-polarized component of the incident light 21 as the light 22 and transmits the S-polarized component of the incident light 21 as the light 23. The light 22 reflected by the reflective polarization plate 12 is incident on the optical projection system 14 and the light 23 transmitted through the reflective polarization plate 12 returns in the direction to the light source 11 as the return light. The light 22 incident on the optical projection system 14 is obtained by subtracting the S-polarized component from the light 20 from the light source 11 and the image projected on the projected medium 15 is a gray image.

Figure 7:
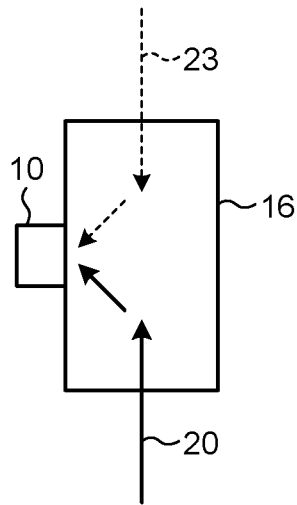
FIG. 7 is a view for illustrating a method of calculating the light amount $Lr_q$ of the return light of each pixel according to the first embodiment.

FIG. 7 schematically illustrates a state in which the light is incident on the optical sensor 10 according to the first embodiment. Meanwhile, in FIG. 7, the same reference numerals are assigned to the portions common to FIG. 4 described above and the detailed description thereof are omitted.

The optical sensor 10 is arranged so as to be able to detect the light 20 in an optical path 16 of the light 20 from the light source 11. In the configuration in FIG. 1 described above, for example, the return light 23 from the reflective light modulator 13 travels along the optical path 16 in the direction opposite to that of the light 20. Therefore, the light 20 and the return light 23 are incident on the optical sensor 10 at the same time and the detection output Dt of the optical sensor 10 takes a value indicating the light amount obtained by adding up the light amount of the light 20 and the light amount of the return light 23.

In the first embodiment, in consideration of each state in FIGS. 6A to 6C described above, the image analyzing unit 320 obtains the gradation value of each pixel of the image data and calculates a ratio of a reflected light amount to an irradiated light amount for each pixel to obtain the ratio of the return light amount (referred to as return light ratio). As an example, if bit depth of the image data is n bits and the gradation value is m ($0 \leq m < 2^n$), a return light ratio $Ra_q$ of each pixel is obtained by following equation (1). Meanwhile, in equation (1), a coefficient k(q) is a value satisfying $0 < k(q) < 1$, depending on the light amount of the light 20 irradiated on each pixel q. A subscript q in the return light ratio $Ra_q$ represents the pixel q.

$$Ra_q = k(q) \times Lo \times \{1 - (m/2^n)^{1/\gamma}\} \quad (1)$$

Figure 8:
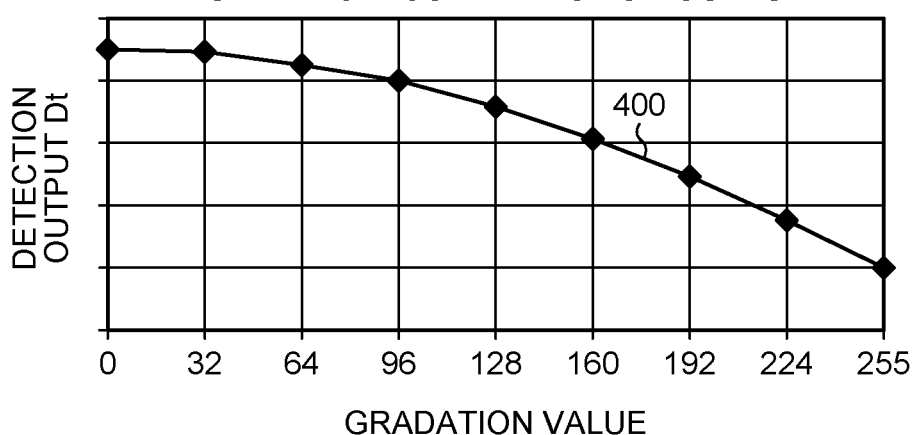
FIG. 8 is a view illustrating an example of a table illustrating relationship between a gradation value and a detection output by an optical sensor applicable to the first embodiment.

Herein, in general, since the image data used for displaying is subjected to the gamma correction processing according to a property of a display (in the example in FIG. 1, an illumination optical unit a3 including the reflective light modulators 119, 125, and 128), relationship between the gradation value and the light amount is not linear. Therefore, the image analyzing unit 320 removes a component of the gamma correction of the image data by using a table illustrating relationship between the gradation value and the light amount, that is to say, the detection output Dt by the optical sensor 10 as illustrated in FIG. 8 to obtain the return light ratio Ra. The table is stored in advance in a non-volatile memory provided on the projecting device 1, for example.

FIG. 8 illustrates an example of a case in which the bit depth n of the image data is eight bits and the gradation value of each pixel is 0 to 255. In FIG. 8, the abscissa and the ordinate show the gradation value and the detection output Dt of the optical sensor 10 respectively. Meanwhile, in this case, the light amount of the return light is minimized when the image data is of the white level and the light amount of the return light is maximized when the image data is of the black level as described above. Therefore, in the example in FIG. 8, a property line 400 indicating the relationship between the gradation value and the light amount has a property opposite to that of a general gamma curve. The coefficient k(q) in equation (1) described above further reflects the property of the property line 400 in FIG. 8.

The return light ratio $Ra_q$ of each pixel calculated by the image analyzing unit 320 is supplied to the distribution correcting unit 321. The distribution correcting unit 321 corrects the return light ratio $Ra_q$ based on distribution of irradiation intensity of the light 20 in a surface of the reflective light modulator 13 and an influence of a position of the optical sensor 10 on the distribution.

Figure 9A:
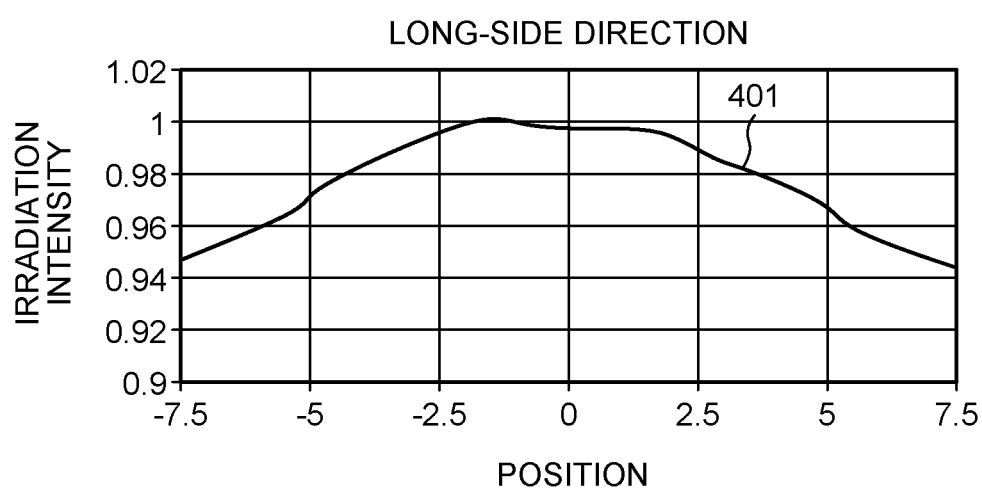
FIGS. 9A and 9B are views illustrating an example of distribution of irradiation intensity in a surface of a reflective light modulator according to the first embodiment.
Figure 9B:
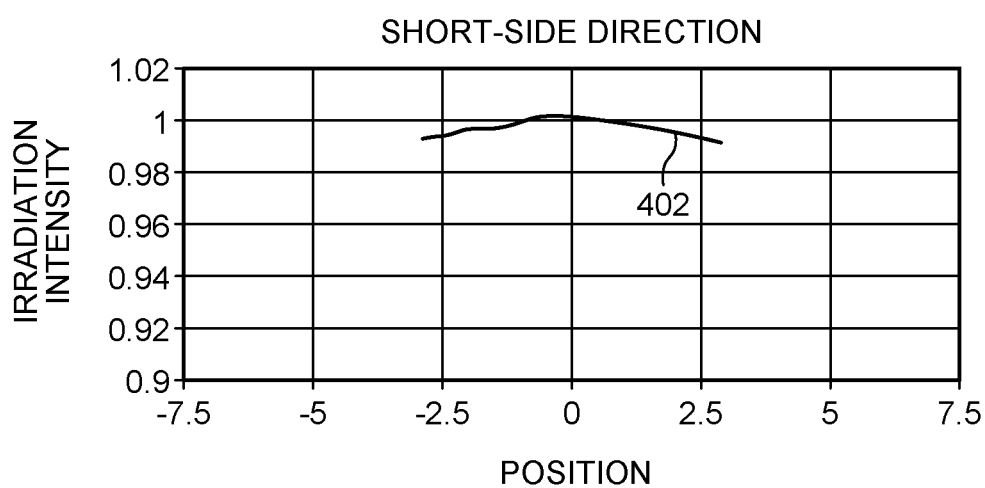

FIGS. 9A and 9B illustrates an example of the distribution of the irradiation intensity of the light 20 in the surface of the reflective light modulator 13 according to the first embodiment. Herein, suppose that the reflective light modulator 13 is a rectangle having a long side and a short side. FIG. 9A illustrates the example of the distribution of the irradiation intensity when the reflective light modulator 13 is seen in a long-side direction (property line 401) and FIG. 9B illustrates the example of the distribution of the irradiation intensity when the reflective light modulator 13 is seen in a short-side direction (property line 402). In FIGS. 9A and 9B, the abscissa shows a distance from the center of the reflective light modulator 13 to the left and right in a long side of the frame, as a negative value in the left side to the front of the image and a positive value in the right side to the front of the image, respectively. The ordinate represents the irradiation intensity normalized by a peak value.

Meanwhile, the examples in FIGS. 9A and 9B are obtained by simulation of the distribution of the irradiation intensity when the light 20 from the light source 11 is irradiated to the center of the reflective light modulator 13 in consideration of a property of the light source 11 and a property of an irradiation optical system from the light source 11 to the reflective light modulator 13. As indicated by the property lines 401 and 402 in FIGS. 9A and 9B, respectively, the irradiation intensity has the distribution which shows its peak in the vicinity of the center of the reflective light modulator 13 and declines toward sides thereof in the element surface of the reflective light modulator 13.

The distribution of the irradiation intensity is detected so as to be different depending on a position of the optical sensor 10. Difference of the distribution of the detection output Dt depending on the position of the optical sensor 10 is described with reference to FIGS. 10A, 10B, 11A and 11B. FIGS. 10A to 11B illustrate examples of simulation of the distribution of the light amount corresponding to each pixel of the reflective light modulator 13 depending on the position of the optical sensor 10, detected by the optical sensor 10 when the light 20 is irradiated to the reflective light modulator 13 with the irradiation intensity distribution illustrated in FIGS. 9A and 9B described above.

Figure 10A:
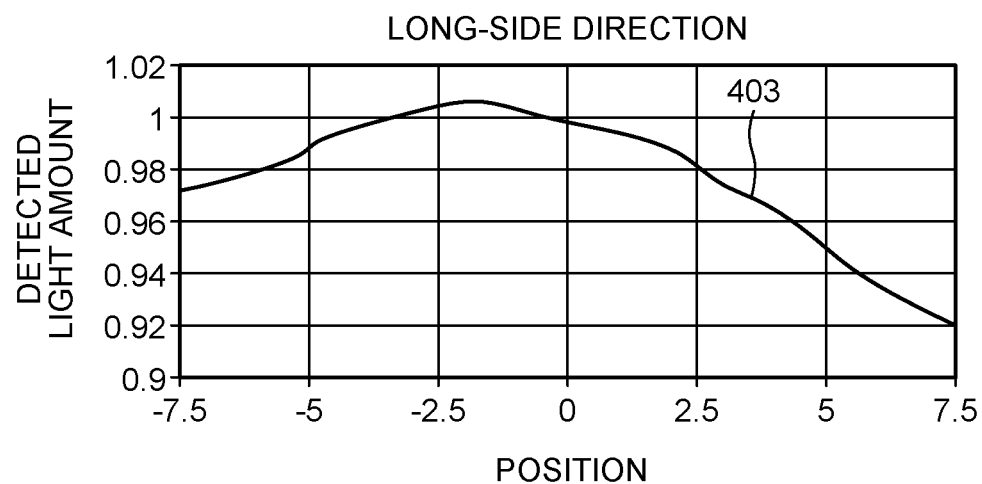
FIGS. 10A and 10B are views for illustrating difference of distribution of a detection output Dt depending on a position of the optical sensor according to the first embodiment.
Figure 10B:
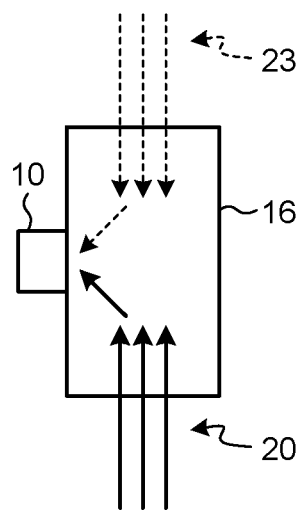

For example, suppose that the optical sensor 10 is arranged on the left of the long side of the reflective light modulator 13 on the optical path 16 through which the return light 21 or 23 and the light 20 from the light source 11 pass as illustrated in FIG. 10B. FIG. 10A illustrates an example of distribution of the light amount of each pixel detected by the optical sensor 10 when the optical sensor 10 is arranged as in FIG. 10B. In this case, as indicated by a property line 403, the property line 401 in FIG. 9A is downwardly inclined to the right and a peak position moves leftward. Similarly, when the optical sensor 10 is arranged on the right of the long side of the reflective light modulator 13 on the optical path 16 as illustrated in FIG. 11B, as indicated by a property line 404 in FIG. 11A, the property line 401 in FIG. 9A is downwardly inclined to the left and the peak position moves rightward.

The return light 23 is detected by the optical sensor 10 as the light emitted from a surface light source corresponding to the element surface of the reflective light modulator 13. Therefore, the light amount of the return light 23 detected by the optical sensor 10 depends on a distance from the optical sensor 10 to a plane corresponding to the element surface of the reflective light modulator 13 in the position of the optical sensor 10.

The distribution correcting unit 321 performs weighting on the return light ratio $Ra_q$ of each pixel based on the distribution of the irradiation intensity in the element surface of the reflective light modulator 13 described with reference to FIGS. 9A and 9B and the distribution of the detected light amount of the return light 23 in the plane corresponding to the element surface in the position of the optical sensor 10 described with reference to FIGS. 10A, 10B, 11A and 11B.

Figure 11A:
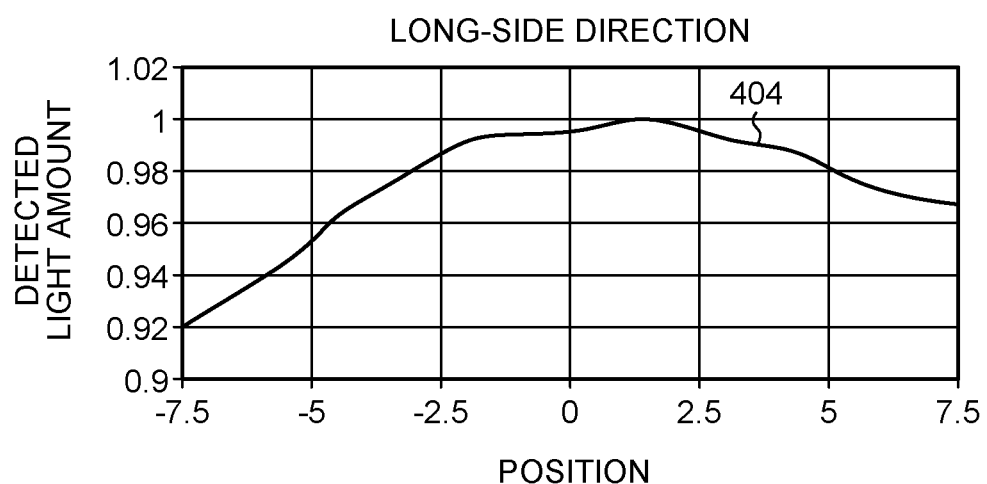
FIGS. 11A and 11B are views for illustrating the difference of the distribution of the detection output Dt depending on the position of the optical sensor according to the first embodiment.
Figure 11B:
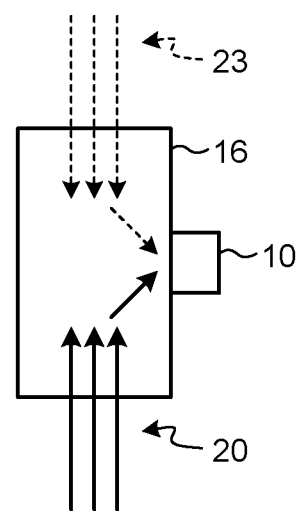

For example, weight for each pixel are obtained based on the distribution indicated by the property lines 401 and 402 in FIGS. 9A and 9B and the distribution indicated by the property line 403 in FIG. 10A or the property line 404 in FIG. 11A depending on the position of the optical sensor 10 in advance to be stored in the non-volatile memory provided on the projecting device 1 as a table. The distribution correcting unit 321 performs the weighting on the return light ratio $Ra_q$ of each pixel supplied from the image analyzing unit 320 with reference to the table on a pixel to pixel basis to output a weighted return light ratio $Ra_q'$ of each pixel. A weighting value of each pixel may further be included in the above-described coefficient k(q).

Meanwhile, although the optical sensor 10 is arranged on one side of the optical path 16 in the examples in FIGS. 10B and 11B, it is not limited to this example. For example, it is also possible to arrange two optical sensors 10 in positions corresponding to both sides of the long side of the reflective light modulator 13 in the optical path 16 by combining the configurations in FIGS. 10B and 11B. According to this, it is possible to inhibit the detected light amount of the optical sensor 10 from depending on the distance from the optical sensor 10. In this case, the distribution correcting unit 321 is not required to consider the distribution indicated by the property line 403 in FIG. 10A or the property line 404 in FIG. 11A. The detection outputs Dt by the two optical sensors 10 are averaged to be used as the detection output Dt.

The return light ratio $Ra_q'$ output from the distribution correcting unit 321 is supplied to the return light ratio calculating unit 322. The return light ratio calculating unit 322 calculates an average value of the return light ratio $Ra_q'$ of each pixel as the return light ratio Ra of the frame. For example, when the amount of pixels in the frame, an index of each pixel, and gradation value of each pixel are represented by a value p, a variation q ($1 \leq q \leq p$), and a value m(q), respectively, the return light ratio Ra may be calculated by following equation (2).

$$Ra = \frac{1}{p} \times \sum_{q=1}^{p} \left\{ k(q) \times \left(1 - \left(\frac{m(q)}{2^n}\right)^{\frac{1}{r}}\right) \right\} \qquad (2)$$

Meanwhile, in the example in FIG. 1 described above, the image data includes the data of the pixels of the respective colors of R, G, and B and the return light of each of the respective colors of R, G, and B is generated by the reflective light modulators 119, 125, and 128. The return light of each of the respective colors of R, G, and B travels inversely along the optical path at the time of incidence to be synthesized by the light separator 115 and detected by the optical sensor 10 together with the light from the light source unit 2. In this case, a return light ratio $Ra_{RGB}$ in the frame in consideration of the return light of the respective colors of R, G, and B may be obtained by following equation (3) by using a return light ratio $Ra_R$ of R color, a return light ratio $Ra_G$ of G color, a return light ratio $Ra_B$ of B color, and coefficients $l_R$, $l_G$, and $l_B$.

$$Ra_{RGB} = (l_R \times Ra_R + l_G \times Ra_G + l_B \times Ra_B)/3 \qquad (3)$$

Herein, the coefficients $l_R$, $l_G$, and $l_B$ are the coefficients for normalizing detected values of an R component, a G component, and a B component of the optical sensor 10 with respect to brightness of the light obtained by synthesizing the R component, G component, and B component in the return light of the respective colors of R, G, and B and satisfy a condition of $l_R + l_G + l_B = 1$. When the gradation values of the respective colors of R, G, and B are the maximum, W light is obtained and the return light ratio $Ra_{RGB}$ takes the minimum value.

The return light ratio Ra calculated by the return light ratio calculating unit 322 is supplied to the light amount of the light source calculating unit 323. The light amount of the light source calculating unit 323 calculates the light amount Lo of the light 20 emitted from the light source 11 based on the detection output Dt supplied from the optical sensor 10 and the return light ratio Ra from the return light ratio calculating unit 322.

Herein, the light amount of the light source calculating unit 323 converts the detection output Dt of the optical sensor 10 to a light amount Ls of the light actually incident on the optical sensor 10 with reference to a table and the like stored in advance in the non-volatile memory of the projecting device 1, for example.

Relationship among the light amount Ls, the light amount Lo of the light 20 from the light source 11, and the light amount Lr of the return light is represented by following equation (4).

$$Ls = Lo + Lr \qquad (4)$$

Herein, the return light amount Lr is a value obtained by multiplying the return light ratio Ra by the light amount Lo of the light 20 as represented by following equation (5). Therefore, equation (4) described above may be transformed as following equation (6) by using equation (5).

$$Lr = Lo \times Ra \qquad (5)$$

$$Ls = Lo + (Lo \times Ra) = Lo \times (1 + Ra) \qquad (6)$$

By transforming equation (6), the light amount Lo of the light 20 from the light source 11 may be calculated by following equation (7).

$$Lo = Ls/(1 + Ra) \qquad (7)$$

The light amount of the light source calculating unit 323 calculates the light amount Lo of the light 20 from the detection output Dt of the optical sensor 10 and the return light ratio Ra calculated based on the image data and the like in the above-described manner. The light amount Lo calculated by the light amount of the light source calculating unit 323 is supplied to the light source driving controller 33. As described above, the light source driving controller 33 compares the supplied light amount Lo with the reference value $L_{ref}$ of the light amount stored in the light amount storage 35, generates the driving control signal such that the light amount of the light source 11 is equal to the light amount according to the reference value $L_{ref}$ and performs the feedback control of the light amount of the light source 11.

In this manner, according to the first embodiment, it is possible to obtain the ratio Ra of the return light from the reflective light modulator 13 based on the video data and calculate the light amount Lo of the light 20 from the light source 11 by using the obtained ratio and the detection output Dt of the optical sensor 10. By calculating the light amount Lo, it is possible to detect the light amount of the light from the light source 11 based on the light amount of the light received by the optical sensor 10. According to this, it becomes possible to control the light amount of the light source 11 with a higher degree of accuracy.

Figure 12:
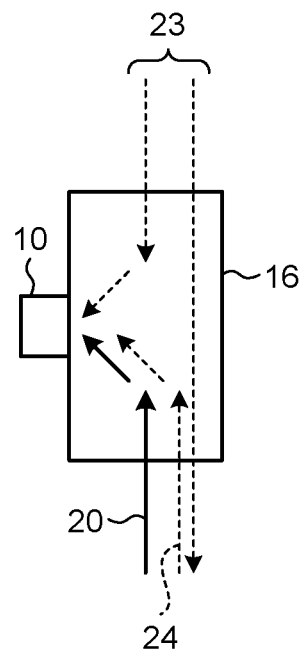
FIG. 12 is a view for illustrating return light traveling in the same direction as light from the light source.

Meanwhile, it is described above that the return light from the reflective light modulator 13 is incident on the optical sensor 10. Actually, return light 24 traveling in the same direction as the light from the light source 11 is also generated as illustrated in FIG. 12. The return light 24 is generated when the return light 23 from the reflective light modulator 13 reaches the light source 11 and reflected by the light source 11 and the periphery of the light source 11 to return as the light 20 from the light source 11. The optical sensor 10 detects the return light 24 together with the light 20 and the return light 23.

In this case, the light amount of the return light 24 is proportional to the light amount of the return light 23, so that the light amount Lo of the light 20 from the light source 11 may be obtained by applying the method similar to the description above.

Figure 13:
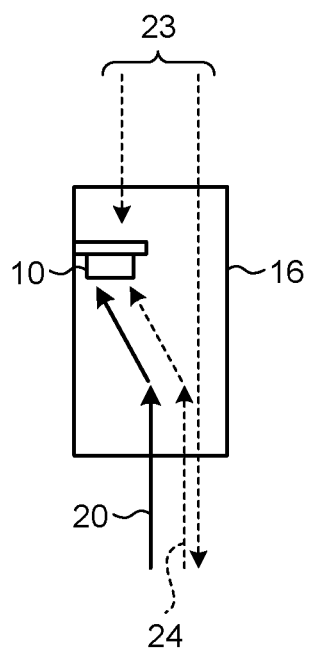
FIG. 13 is a view for illustrating a manner in which the optical sensor is prevented from detecting the return light.

As illustrated in FIG. 13, it is also possible to direct the optical sensor 10 to the light source 11 such that the return light 23 from the reflective light modulator 13 is not detected by the optical sensor 10. However, in this case also, the above-described return light 24 is incident on the optical sensor 10 and it is difficult to detect only the light 20.

First Variation of First Embodiment

Figure 14:
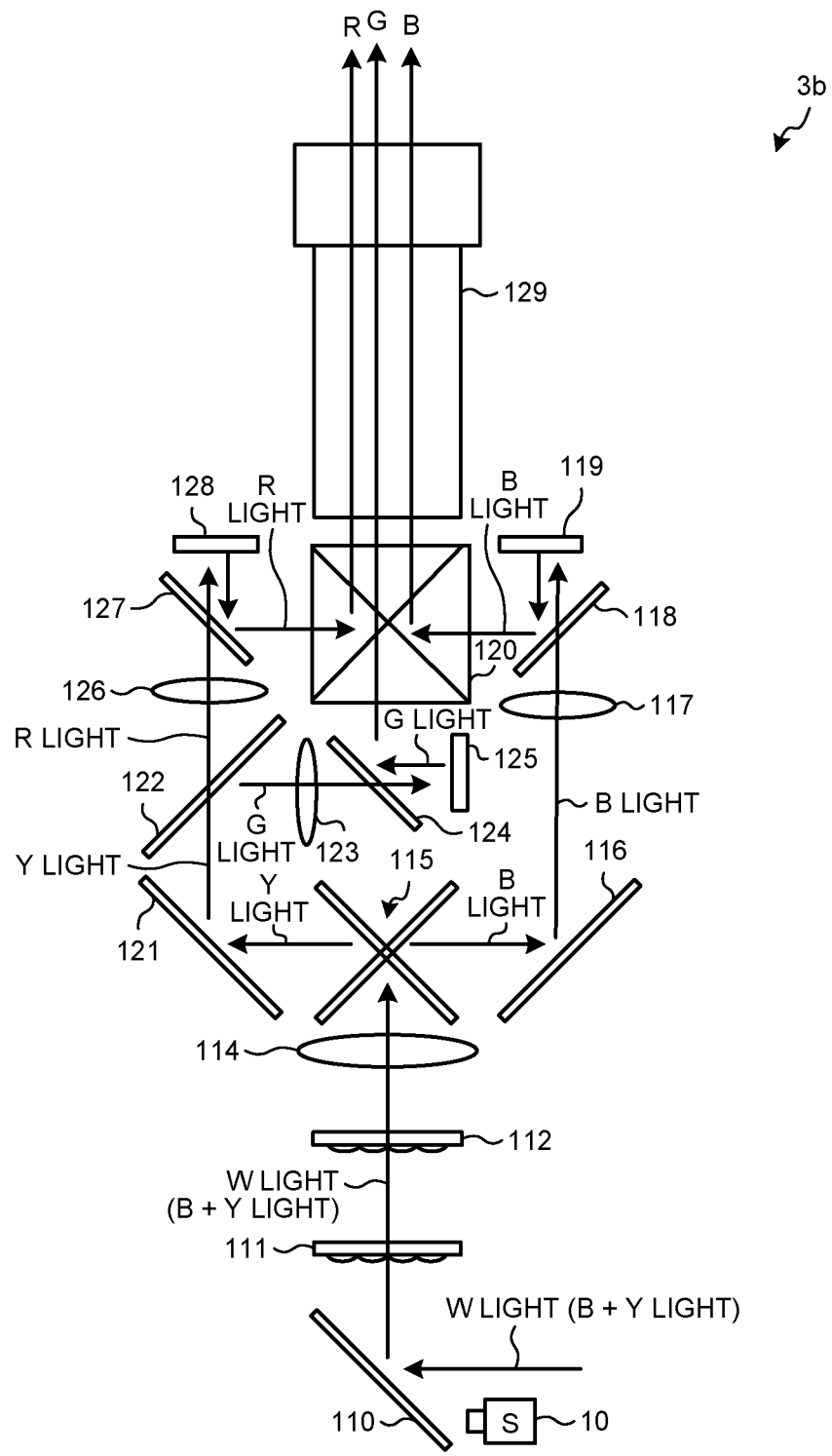
FIG. 14 is a view illustrating an example of an illumination optical system according to a first variation of the first embodiment.
Figure 15:
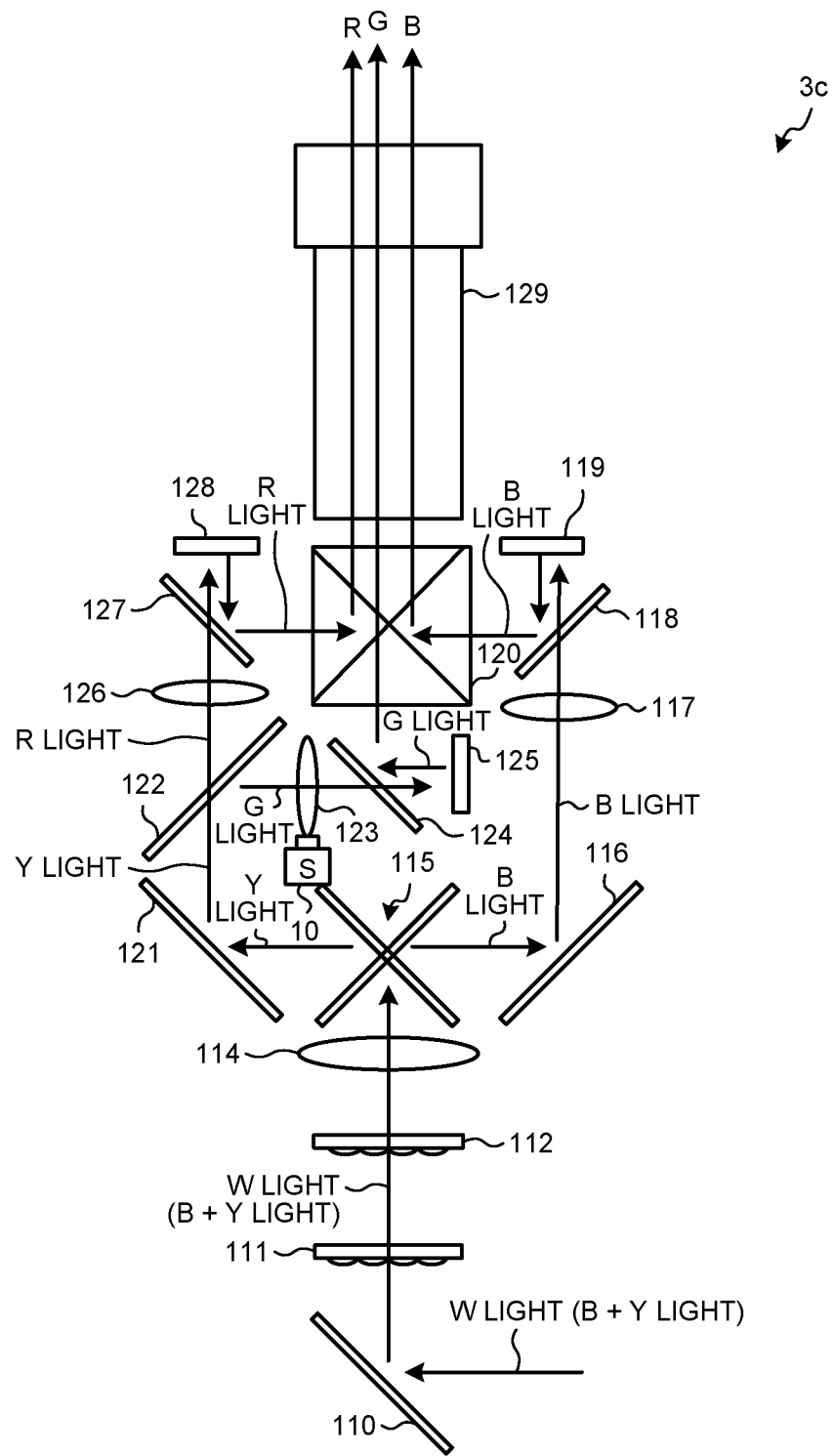
FIG. 15 is a view illustrating an example of an illumination optical system according to a second variation of the first embodiment.

Next, a first variation of the first embodiment is described. FIG. 14 illustrates an example of an illumination optical unit according to the first variation of the first embodiment. Meanwhile, in FIG. 14 and in FIG. 15 described later, the same reference numerals are assigned to the portions common to FIG. 1 described above and the detailed description thereof are omitted. In FIGS. 14 and 15, a light source unit 2 in FIG. 1 is omitted.

Although the optical sensor 10 is provided in proximity to the side surface of the polarization conversion element 113 in the above-described first embodiment, it is not limited to this example. The first variation of the first embodiment is the example in which the optical sensor 10 is arranged so as to be closer to a light source than a fly-eye lens 111 in an illumination optical unit 3b as illustrated in FIG. 14. In the example in FIG. 14, the optical sensor 10 is arranged in a position of a mirror 110.

In this manner, by arranging the optical sensor 10 so as to be closer to the light source than the fly-eye lens 111, light is dispersed by the fly-eye lenses 111 and 112 and uniformity of the light irradiated to reflective light modulators 119, 125, and 128 is maintained even when the optical sensor 10 is arranged in a position to block W light (B light and Y light) from the light source unit 2.

Second Variation of First Embodiment

Next, a second variation of the first embodiment is described. FIG. 15 illustrates an example of an illumination optical unit according to the second variation of the first embodiment. In the second variation of the first embodiment, as illustrated in FIG. 15, in an illumination optical unit 3c, an optical sensor 10 is arranged in one of optical paths of R light, G light, and B light obtained after separating W light into the R light, G light, and B light. In the example in FIG. 15, the optical sensor 10 is arranged on a side surface of a lens 123 located between a side on which the G light is reflected of a color component separator 122 which separates the Y light into the G light and R light and a reflective polarization plate 124 corresponding to a reflective light modulator 125 to which the G light is irradiated.

By arranging the optical sensor 10 in one of the optical paths of the R light, G light, and B light in this manner, a single color light receiving sensor with sensitivity to a single color may be used as the optical sensor 10. The single color light receiving sensor has a narrower wavelength band with sensitivity than that of a white light receiving sensor described above and may be obtained at a lower cost than the white light receiving sensor. There is no limitation and it is also possible to arrange the optical sensors 10 in the optical paths of the R light, G light, and B light. In this case, equation (3) described above may be applied to an output of each optical sensor 10 arranged in each of the optical paths of the R light, G light, and B light.

Second Embodiment

Figure 16:
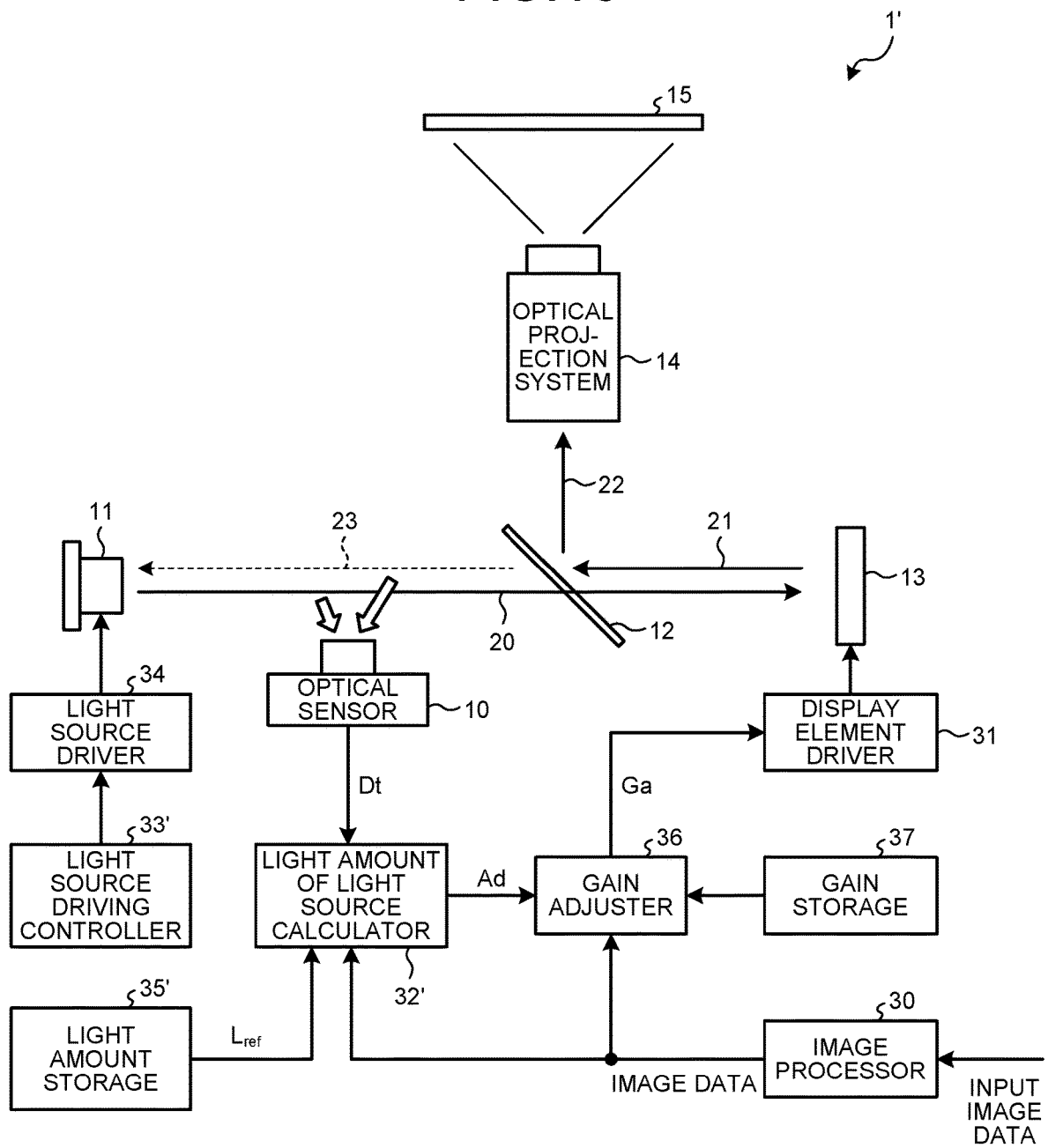
FIG. 16 is a block diagram illustrating a configuration of an example of a projecting device according to a second embodiment with a focus on a signal processing system.

Next, a second embodiment is described. FIG. 16 illustrates a configuration of an example of a projecting device 1' according to the second embodiment with a focus on a signal processing system. Meanwhile, in FIG. 16, the same reference numerals are assigned to the portions common to FIG. 4 described above and the detailed description thereof are omitted. In the second embodiment, configurations of a light source unit 2 and an illumination optical unit 3a described with reference to FIGS. 1 to 3 may be applied without change.

In the projecting device 1' illustrated in FIG. 16, a light source driving controller 33' controls a light source driver 34 without using an output of a light amount of a light source calculator 32' and a reference value $L_{ref}$ for a light amount of a light source 11 to emit light 20 from the light source 11. That is to say, the projecting device 1' does not perform feedback control of the light amount of the light source 11.

The projecting device 1' is obtained by adding a gain adjuster 36 and a gain storage 37 to the projecting device 1 in FIG. 4. The light amount of the light source calculator 32' calculates a light amount Lo of the light 20 from the light source 11 as described above based on a detection output Dt of the optical sensor 10 and image data in the above-described manner. Then, the light amount of the light source calculator 32' obtains a gain adjusting value Ad for adjusting a gain when a reflective light modulator 13 is driven based on the calculated light amount Lo and the reference value $L_{ref}$ of the light amount stored in advance in the light amount storage 35'. The light amount of the light source calculator 32' supplies the gain adjuster 36 with the gain adjusting value Ad.

The gain adjuster 36 adjusts the gain for the image data by using the gain adjusting value Ad.

Meanwhile, the gain is a gain for the image data when a display element driver 31 drives the reflective light modulator 13. For example, it is possible to adjust brightness of a projected image projected on a projected medium 15 based on the image data by adding/multiplying a value of the gain to/by a gradation value of each pixel of the image data. Hereinafter, it is described supposing that the value of the gain is multiplied by the gradation value of the image data.

For example, in a case in which the light source 11 emits the light 20 with a predetermined light amount Lo at the time of factory shipping or system setting, the gain value by which the projected image projected on the projected medium 15 has predetermined luminance is obtained and the obtained gain value is stored in the gain storage 37 as an initial gain value $G_{ref}$. For example, the gain adjuster 36 sets the initial gain value $G_{ref}$ stored in advance in the gain storage 37 as the gain value for the image data initially, for example, at first activation of the projecting device 1'.

Figure 17:
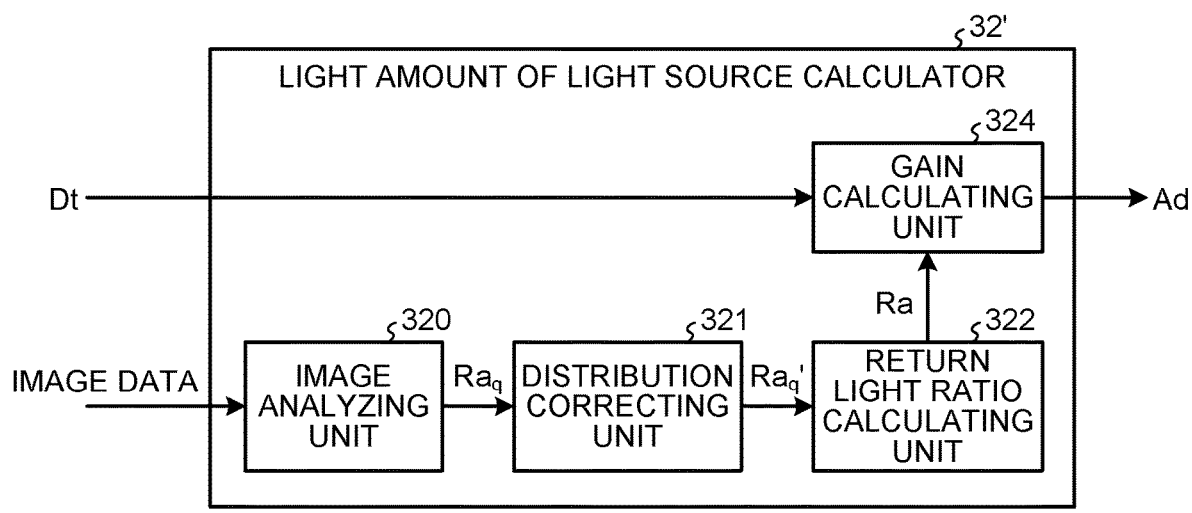
FIG. 17 is a block diagram illustrating a configuration of an example of a light amount of a light source calculator according to the second embodiment.

FIG. 17 illustrates a configuration of an example of the light amount of the light source calculator 32' according to the second embodiment. Meanwhile, in FIG. 17, the same reference numerals are assigned to the portions common to FIG. 5 described above and the detailed description thereof are omitted.

In FIG. 17, the light amount of the light source calculator 32' includes an image analyzing unit 320, a distribution correcting unit 321, a return light ratio calculating unit 322, and a gain calculating unit 324. The image analyzing unit 320, the distribution correcting unit 321, and the return light ratio calculating unit 322 calculate a return light ratio Ra based on the image data by using each table described with reference to FIGS. 8, 10A, and 11A, and equations (1) to (3). The return light ratio Ra is supplied to the gain calculating unit 324.

The gain calculating unit 324 calculates the light amount Lo of the light source 11 according to equations (4) to (7) described above by using the return light ratio Ra and the detection output Dt of the optical sensor 10. Then, the gain calculating unit 324 obtains the reference value $L_{ref}$ of the light amount from the light amount storage 35' to calculate the gain adjusting value Ad according to following equation (8). Meanwhile, the gain adjusting value Ad may also be obtained by multiplying a predetermined coefficient by equation (8). The gain calculating unit 324 supplies the gain adjuster 36 with the calculated gain adjusting value Ad.

$$Ad = Lo/L_{ref} \qquad (8)$$

The gain adjuster 36 adjusts a gain of the image data by using the gain adjusting value Ad supplied from the light amount of the light source calculator 32' and supplies the display element driver 31 with image data Ga the gain of which is adjusted.

In this manner, in the projecting device 1' according to the second embodiment, as in the projecting device 1 according to the first embodiment described above, the ratio Ra of the return light from the reflective light modulator 13 is obtained based on the image data and the light amount Lo of the light 20 from the light source 11 is calculated by using the obtained ratio and the detection output Dt of the optical sensor 10. Since the gain of the image data is adjusted based on the calculated light amount Lo of the light source 11, fluctuation of the projected image projected on the projected medium 15 with respect to fluctuation of the light amount Lo of the light source 11 is inhibited.

Meanwhile, the initial gain value $G_{ref}$ stored in the gain storage 37 may be "1.0", for example, or a value satisfying "$0 < G_{ref} < 1.0$". When the initial gain value $G_{ref}$ is set to the value "1.0", projection with maximum luminance becomes possible. On the other hand, when the initial gain value $G_{ref}$ is set to "$0 < G_{ref} < 1.0$", the luminance of the projected image may be maintained even when the light source 11 is deteriorated.

Variation of Second Embodiment

Next, a variation of the second embodiment is described. In a projecting device 1 illustrated in FIG. 1, there is a case in which balance among an R color component, a G color component, and a B color component in projection light changes from that in an initial state by change over time of a system. Herein, the change over time of the system includes deterioration of a fluorescent substance wheel 600 and change in spectral transmission of an optical part, for example, in a case of an example in FIG. 1.

In the variation of the second embodiment, a gain may be adjusted for each of the R color, G color, and B color. According to this, the balance among the R component, G component, and B component may be restored to the balance in the initial state when the balance among the R component, G component, and B component is changed.

Figure 18:
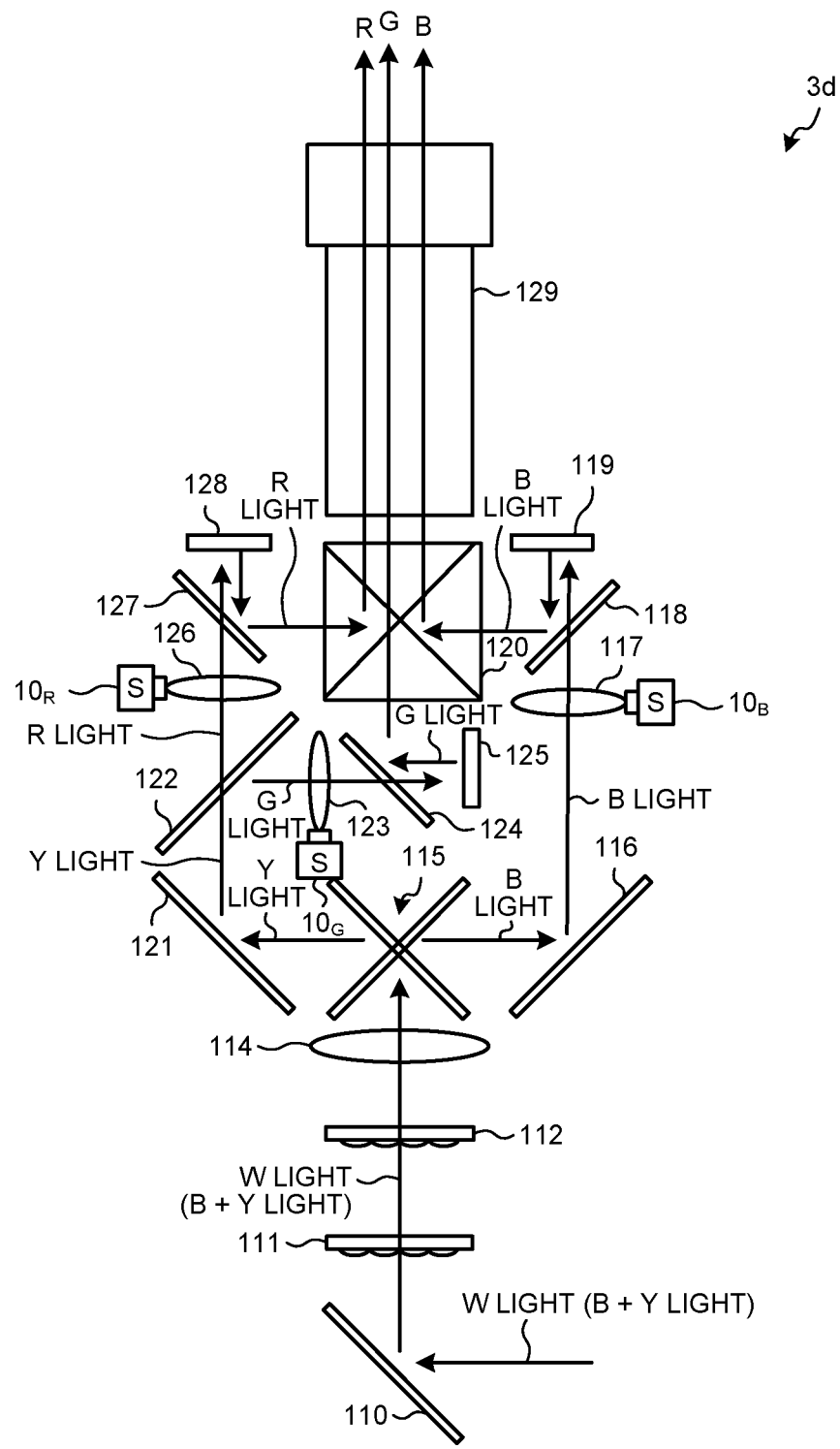
FIG. 18 is a view illustrating an example of an illumination optical system according to a variation of the second embodiment.

FIG. 18 illustrates an example of an illumination optical unit 3d according to the variation of the second embodiment. In the variation of the second embodiment, as illustrated in FIG. 18, in the illumination optical unit 3d, optical sensors $10_R$, $10_G$, and $10_B$ are arranged for optical paths of R light, G light, and B light obtained after separating W light into the R light, G light, and B light. In the example in FIG. 18, the optical sensor $10_R$ for detecting the R light is arranged on a side surface of a lens 126, the optical sensor $10_G$ for detecting the G light is arranged on a side surface of a lens 123, and the optical sensor $10_B$ for detecting the B light is arranged on a side surface of a lens 117. The optical sensors $10_R$, $10_3$, and $10_B$ correspond to the optical sensor 10 illustrated in FIG. 16.

In the variation of the second embodiment, a light amount of a light source calculator 32', a light amount storage 35', a gain adjuster 36, and a gain storage 37 in FIG. 16 described above are provided for each of the R light, G light, and B light. The light amount storages 35' of the respective colors of R, G, and B store in advance initial values of light amounts of the R light, G light, and B light.

For example, the light amount of the light source calculator 32' of the R color selects pixel data of the R color out of the pixel data of the respective colors of R, G, and B included in image data and calculates a light amount $Lo_R$ of the R light as described above based on the selected pixel data of the R color and a detection output $Dt_R$ of the optical sensor $10_R$ corresponding to the R color. The light amount of the light source calculator 32' of the R color obtains a gain adjusting value $Ad_R$ for adjusting the gain when a reflective light modulator 13 of the R color, corresponding to a reflective light modulator 128 in FIG. 18, is driven, based on the calculated light amount $Lo_R$ and the initial value of the light amount of the R light stored in advance in the light amount storage 35'. The light amount of the light source calculator 32' of the R color supplies a display element driver 31 which drives the reflective light modulator 13 of the R color with the obtained gain adjusting value $Ad_R$.

The same applies to the light amount of the light source calculator 32' of the G color and B color. That is to say, the light amount of the light source calculators 32' of the G color and B color calculate light amounts $Lo_G$ and $Lo_B$ of the G light and B light based on the pixel data of the G color and B color out of the pixel data of the respective colors of R, G, and B included in the image data and detection outputs $Dt_G$ and $Dt_B$ of the optical sensors 10G and 10B corresponding to the G color and B color, respectively. Then, the light amount of the light source calculators 32' of the G color and B color obtain gain adjusting values $Ad_G$ and $Ad_B$ for adjusting the gains when the reflective light modulators 13 of the G color and B color corresponding to the reflective light modulators 125 and 119 in FIG. 18 are driven, based on the calculated light amounts $Lo_G$ and $Lo_B$ and the initial values of the light amounts of the G light and B light stored in advance in the light amount storages 35' of the G color and B color. The light amount of the light source calculators 32' of the G color and B color supply the obtained gain adjusting values $Ad_G$ and $Ad_B$ to the display element driver 31 which drives the reflective light modulator 13 of the G color and the display element driver 31 which drives the reflective light modulator 13 of the G color.

In this manner, according to the variation of the second embodiment, the gains for the reflective light modulators 128, 125, and 119 of the respective colors of R, G, and B are independently adjusted for each color of R, G, and B, and the balance among the R component, G component, and B component in the projection light may be maintained as the balance in the initial state in the illumination optical unit 3d.

The present invention has an effect that a light amount of light from a light source may be detected with a high degree of accuracy when a reflective light modulator is used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A detecting method of detecting a light amount of light from a light source of a projecting device configured to irradiate the light emitted from the light source, via a polarization plate, to a reflective light modulator configured to modulate irradiated light to reflect based on image data and project the light reflected by the light modulator, the polarization plate is provided between the light source and the light modulator, the detection method comprising:

calculating a ratio of return light returning from the light modulator to the light source to the light irradiated to the light modulator based on the image data; and calculating the light amount of the light emitted from the light source by using a detection output of an optical sensor located physically between the light source and the polarization plate and the calculated ratio, the detection output is a signal value processed by a program on a CPU or hardware circuit, wherein the optical sensor being arranged on a side of an optical path of the light emitted from the light source, and the calculated ratio including a weight depending on a distance from the optical sensor to positions of the light in an in-plane direction of a plane perpendicular to the optical path.

2. The detecting method according to claim 1, wherein the ratio is calculated based on a gradation value of each pixel of the image data.

3. The detecting method according to claim 2, wherein the ratio is calculated by weighting on a pixel to pixel basis according to distribution of an irradiated light amount in an element surface of the light modulator when the light emitted from the light source is irradiated to the element surface of the light modulator.

4. The detecting method according to claim 3, wherein when calculating the ratio, the distribution of the irradiated light amount is corrected based on a position of the optical sensor to perform the weighting on a pixel to pixel basis based on the corrected distribution.

5. A detecting device configured to detect a light amount of light from a light source of a projecting device configured to irradiate the light emitted from the light source, via a polarization plate, to a reflective light modulator configured to modulate irradiated light to reflect based on image data and project the light reflected by the light modulator, the polarization plate is provided between the light source and the light modulator, the detecting device comprising:

an optical sensor located physically between the light source and the polarization plate;

a ratio calculator configured to calculate a ratio of return light returning from the light modulator to the light source to the light irradiated to the light modulator based on the image data; and a light amount calculator configured to calculate the light amount of the light emitted from the light source by using a detection output of the optical sensor and the ratio calculated by the ratio calculator, the detection output is a signal value processed by a program on a CPU or hardware circuit, wherein the optical sensor being arranged on a side of an optical path of the light emitted from the light source, and the calculated ratio including a weight depending on a distance from the optical sensor to positions of the light in an in-plane direction of a plane perpendicular to the optical path.

6. A projecting device comprising:

a reflective light modulator configured to modulate light emitted from a light source via a polarization plate provided between the light source and the light modulator to reflect based on image data;

an optical projector configured to project the light modulated by the light modulator;

an optical sensor located physically between the light source and the polarization plate;

a ratio calculator configured to calculate a ratio of return light returning from the light modulator to the light source to the light irradiated to the light modulator based on the image data;

a light amount calculator configured to calculate a light amount of the light emitted from the light source by using a detection output of the optical sensor and the ratio calculated by the ratio calculator, the detection output is a signal value processed by a program on a CPU or hardware circuit, wherein the optical sensor being arranged on a side of an optical path of the light emitted from the light source, and the calculated ratio including a weight depending on a distance from the optical sensor to positions of the light in an in-plane direction of a plane perpendicular to the optical path; and a driver configured to control the light amount of the light source based on the light amount calculated by the light amount calculator.

7. A projecting device comprising:

a reflective light modulator configured to modulate light emitted from a light source via a polarization plate provided between the light source and the light modulator to reflect based on image data;

an optical projector configured to project the light modulated by the light modulator;

an optical sensor located physically between the light source and the polarization plate;

a ratio calculator configured to calculate a ratio of return light returning from the light modulator to the light source to the light irradiated to the light modulator based on the image data;

a light amount calculator configured to calculate a light amount of the light emitted from the light source by using a detection output of the optical sensor and the ratio calculated by the ratio calculator, the detection output is a signal value processed by a program on a CPU or hardware circuit, wherein the optical sensor being arranged on a side of an optical path of the light emitted from the light source, and the calculated ratio including a weight depending on a distance from the optical sensor to positions of the light in an in-plane direction of a plane perpendicular to the optical path; and a gain controller configured to control a gain of the image data based on the light amount calculated by the light amount calculator.

8. The detecting method according to claim 1, wherein calculating a value of a sensor light amount detected by the optical sensor, based on the signal value of the detection output, the sensor light amount is the total amount of the light amount of the return light and the light amount of the light emitted from the light source, and calculating the light amount of the light emitted from the light source, based on a value into which the value of a sensor light amount is divided by the ratio of the return light.

9. The detecting method according to claim 1, wherein, a polarization conversion element is situated between the polarization plate and the light source, wherein the optical sensor detects the light provided in proximity to the polarization conversion element.

10. The detecting method according to claim 9, wherein, the polarization conversion element is obtained by combining a polarization beam splitter and a $\lambda/2$ plate.

11. The detecting method according to claim 1, wherein, a fly-eye lens is situated between the polarization plate and the light source, wherein the optical sensor detects the light between the fly-eye lens and the light source.

12. The detecting method according to claim 1, wherein, a total value is detected as the detection output by the optical sensor, the total value is a total of the light amount of the light emitted from the light source and the light amount of the return light returning from the light modulator to the light source via the polarization plate, and the light amount of the light emitted from the light source is calculated by using the detection output and the calculated ratio.

13. The detecting method according to claim 1, wherein the optical sensor being arranged on a left side or a right side of a long side of the light modulator on the optical path.

* * * * *